United States Patent [19]

Heim

[11] 3,746,989

[45] July 17, 1973

[54] ADAPTIVE EQUALIZER FOR DIGITAL INFORMATION

[75] Inventor: David E. Heim, Urbana, Ill.

[73] Assignee: The Magnavox Company, Fort Wayne, Ind.

[22] Filed: Sept. 30, 1971

[21] Appl. No.: 185,211

[52] U.S. Cl. ........................ 325/42, 325/30, 325/65, 325/320, 325/324, 325/325, 333/18, 178/66, 178/88

[51] Int. Cl. ............................................ H04b 1/10

[58] Field of Search ................. 325/30, 42, 65, 320, 325/325, 324; 333/18, 28; 178/66, 88

[56] References Cited

UNITED STATES PATENTS

| | | | |
|---|---|---|---|
| 3,571,733 | 3/1971 | Fang | 325/42 |
| 3,544,716 | 12/1970 | Franaszek | 333/18 |
| 3,414,819 | 12/1968 | Lucky | 325/42 |

*Primary Examiner*—Albert J. Mayer
*Attorney*—Joseph A. Naughton, Jr.

[57] ABSTRACT

An adaptive equalizer is disclosed which can be used to equalize digital information sent over the switched telephone network. Frequency shift keyed signals pass through an electronically controllable frequency domain equalizer to a discriminator. A voltage proportional to transmission quality is derived from the discriminator output and the equalizer is adjusted to maximize this voltage.

11 Claims, 6 Drawing Figures

INVENTOR
DAVID E. HEIM
BY
Woodard Weikart Emhardt & Naughton
ATTORNEYS

INVENTOR
DAVID E. HEIM
BY
Woodard, Weikart, Emhardt & Naughton
ATTORNEYS

INVENTOR
DAVID E. HEIM
BY
Woodard, Weikart, Emhardt & Naughton
ATTORNEYS

ADAPTIVE EQUALIZER FOR DIGITAL INFORMATION

BACKGROUND OF THE INVENTION

1. Field of the Invention:

This invention relates to an adaptive equalizer for digital information.

2. Description of the Prior Art:

Adaptive equalizer systems are known which use a transversal filter in a time domain adaptive equalizer system. Adaptive equalizer systems are also known which use reversible counters. U.S. Pat. Nos. 3,368,168 and 3,414,819 (Re27,047) to Lucky illustrate this. Such systems of the prior art make adjustments of various sections of the equalizer simultaneously and determine error by subtracting the equalized signal from the actual digital data output.

SUMMARY OF THE INVENTION

This invention relates to a particular adaptive equalizer system which develops a voltage representative of the quality of an equalized signal, the voltage being a function of the amount of time the digital information is in transition from one state to another. This invention also relates to an adaptive equalizer system in which the equalizer has a plurality of sections, each of which is adjusted at a different time in sequence. This invention also relates to an adaptive equalizer system which uses a particular frequency domain equalizer.

DESCRIPTION OF THE PREFERRED EMBODIMENT

Figure 1:
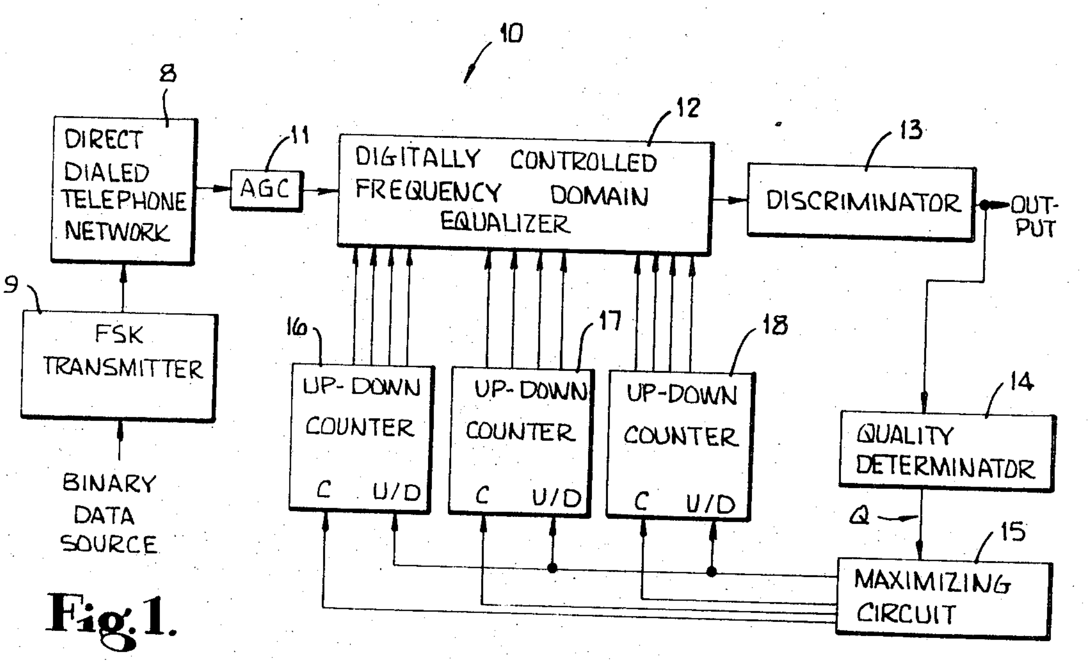
FIG. 1 is a block diagram of an adaptive equalizer system embodying the invention.

Referring to FIG. 1, there is illustrated an adaptive equalizer system 10 embodying the invention. A frequency shift keyed (FSK) transmitter 9 which switches the carrier frequency between 1200 Hz and 2400 Hz in accordance with the signal from a binary data source connects to the direct dialed telephone network 8. Frequency shifts occur coincident with the binary data transitions such that the output wave is continuous in phase. A 2400 bit per second data rate at the binary data source allows the shifts to always occur at the peaks of the sinusoidal carriers. The output waveform from the transmitter 9 is thus composed of segments of either one cycle of a 2400 Hz cosine wave of one-half cycle of a 1200 Hz cosine wave, hence the name cosine signalling.

The FSK signal from the telephone line is brought to a desired level by an automatic gain control circuit 11 of conventional design. This then connects to a digitally controlled frequency domain equalizer 12. To determine the quality of the equalized signal there is a discriminator 13 to demodulate the frequency shift keyed signal, and a quality determinator 14. The data output is taken from the discriminator 13.

The output of the quality determinator is a voltage Q which varies with the quality of the equalized signal. To adjust the equalizer to maximize this Q voltage, there are a maximizing circuit 15 and three up-down counters 16, 17 and 18. The maximizing circuit 15 controls the up-down counters 16, 17 and 18 which control the characteristics of the equalizer 12.

Figure 2:
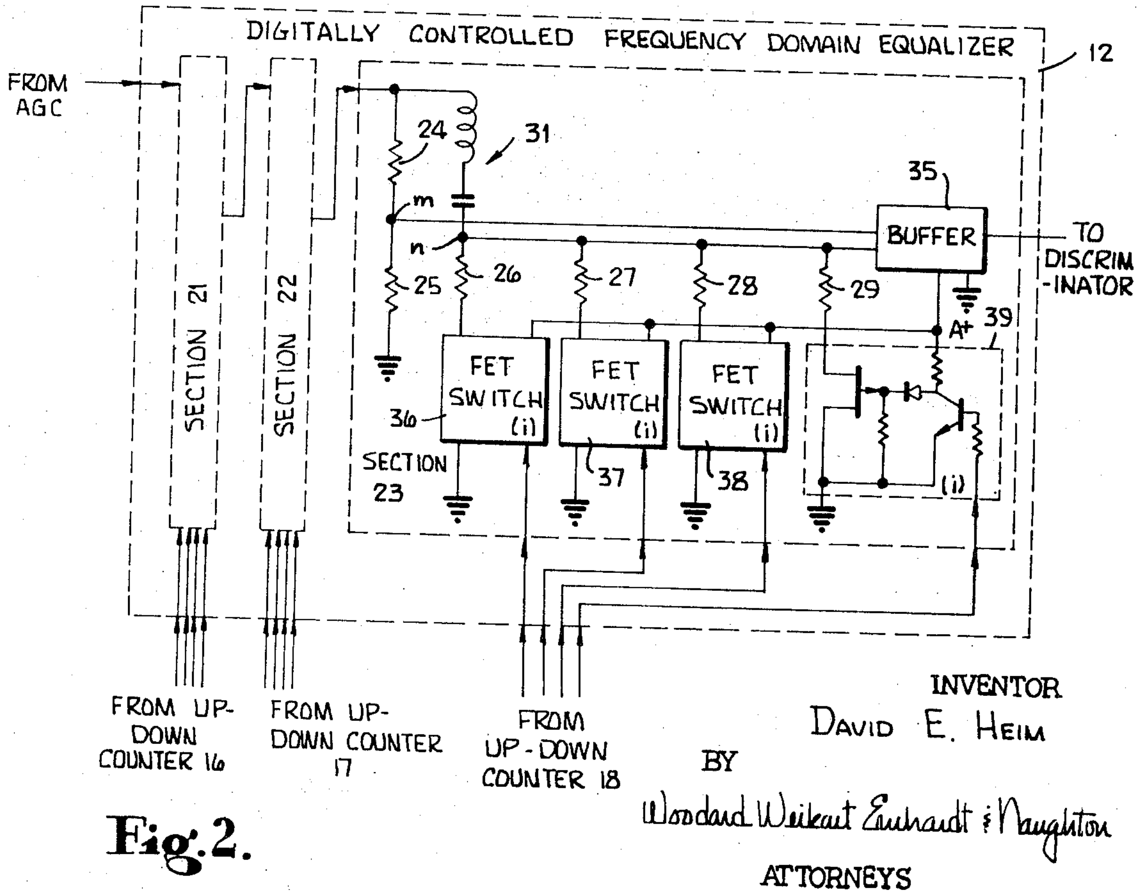
FIG. 2 is a block diagram of the digitally controlled frequency domain equalizer of FIG. 1.

The equalizer 12 of FIG. 1 is shown in more detail in FIG. 2. The equalizer is composed of three cascaded sections in which resistors switched by field effect transistors (FETs) change the phase characteristics. The three sections are essentially identical except that they are designed to operate at different frequencies.

Because of the identical circuit arrangement of the sections, only section 23 is illustrated in detail. The input of section 23 connects across a bridge circuit, one side of the bridge including two series resistors 24 and 25 and other side of the bridge including a series LC circuit 31 in series with four parallel switched resistors 26, 27, 28 and 29. The resistors 26, 27, 28 and 29 are switched with FET switches 36, 37, 38 and 39. Since all of the FET switches are identical only switch 39 is illustrated in detail. The frequency of the peak in envelope delay compensation is determined by the resonant frequency of the series LC circuit 31 and is different in each section.

The buffer 35 is used to convert the output taken from points m and n of the bridge to an unbalanced line output.

The resistors 26, 27, 28 and 29 are chosen such that the resistance of resistor 26 is twice that of resistor 27, four times that of resistor 28 and eight times that of resistor 29. With the larger value resistors equal to an integer power of two times the value of the smallest resistor, the conductance from point *n* to ground due to resistors 26, 27, 28 and 29 is a function of the binary count at the inputs (*i*) of the binary switches 36, 37, 38 and 39. Since the updown counters 16, 17 and 18 have binary count outputs, the conductance from point n to ground will vary as a function of the count of counter 18, because its four output lines are each connected to the corresponding FET switches.

Figure 3:
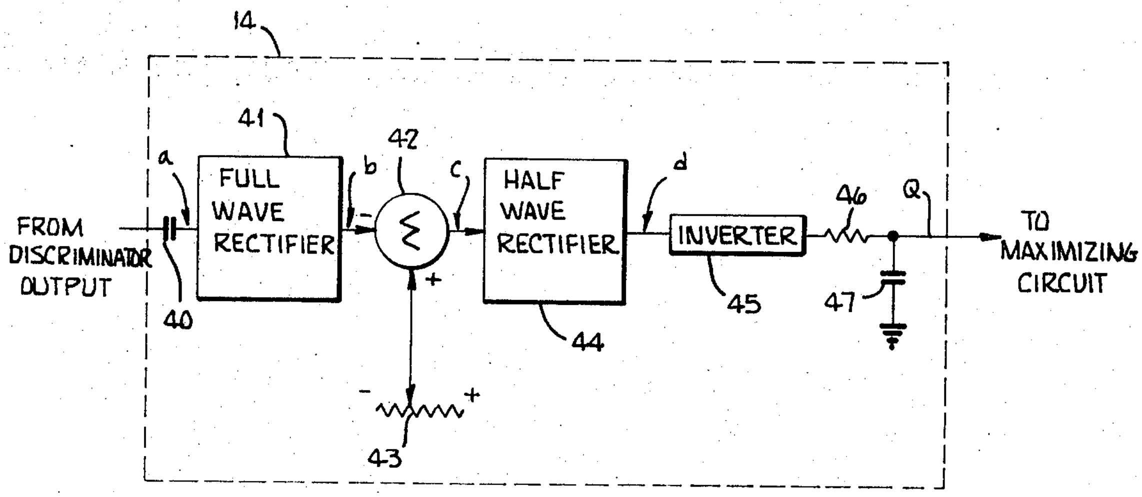
FIG. 3 is a block diagram of the quality determinator of FIG. 1.
Figure 4:
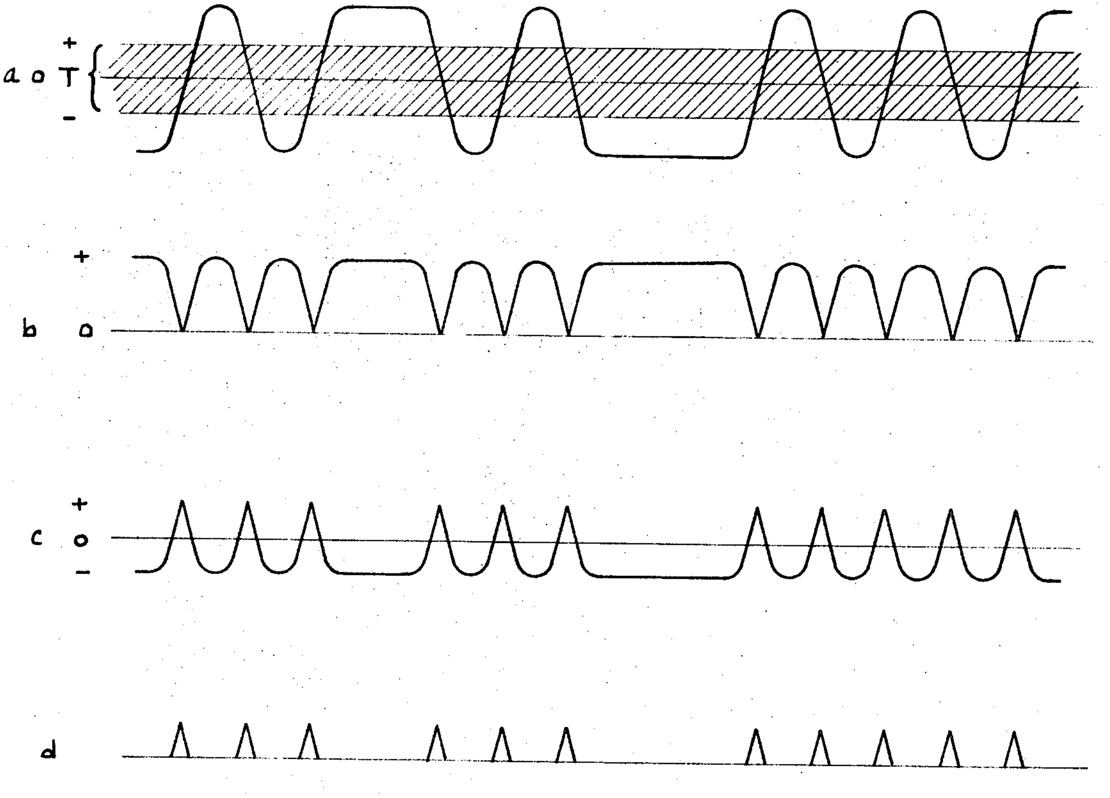
FIG. 4 shows four waveforms which illustrate the functioning of the quality determinator of FIG. 3.

The quality determinator 14 of FIG. 1 is shown in more detail in FIG. 3. The discriminator output is coupled through a capacitor 40 which removes any DC component which is present. To facilitate understanding the quality determinator 14, various waveforms are illustrated in FIG. 4 and correspond to the type which would be found at various points in the quality determinator. FIG. 4*a* represents a typical binary signal at point a of FIG. 3. A shaded area T centered around O is an area which is at neither of the two logic states but rather is in between the two. This is the area of importance in determining quality because best equalization will be attained when the time spent in transition between logic states is minimum. For perfect equalization the waveform has transition times limited by the discriminator response. Intersymbol interference will, in general, cause the transition times to increase and will distort the logic levels.

One function of the quality determinator is to develop a voltage which represents the amount of time the waveform is in transition between logic states. For this purpose, a full wave rectifier 41 is used to produce a signal illustrated in FIG. 4*b*. This signal is subtracted from a DC component furnished by potentiometer 43, by summation circuit 42, to produce a signal illustrated in FIG. 4*c*. The adjustment of potentiometer 43 determines the DC component added. A half wave rectifier 44 then eliminates the negative portion of the signal as illustrated in FIG. 4*d*. This rectified signal is representative of the time that the discriminator output is in transition between logic states. The output of rectifier 44 is inverted by inverter 45 and integrated by resistor 46 and capacitor 47 to provide a voltage "Q"which represents transition time and hence the quality of the binary signal.

Figure 5:
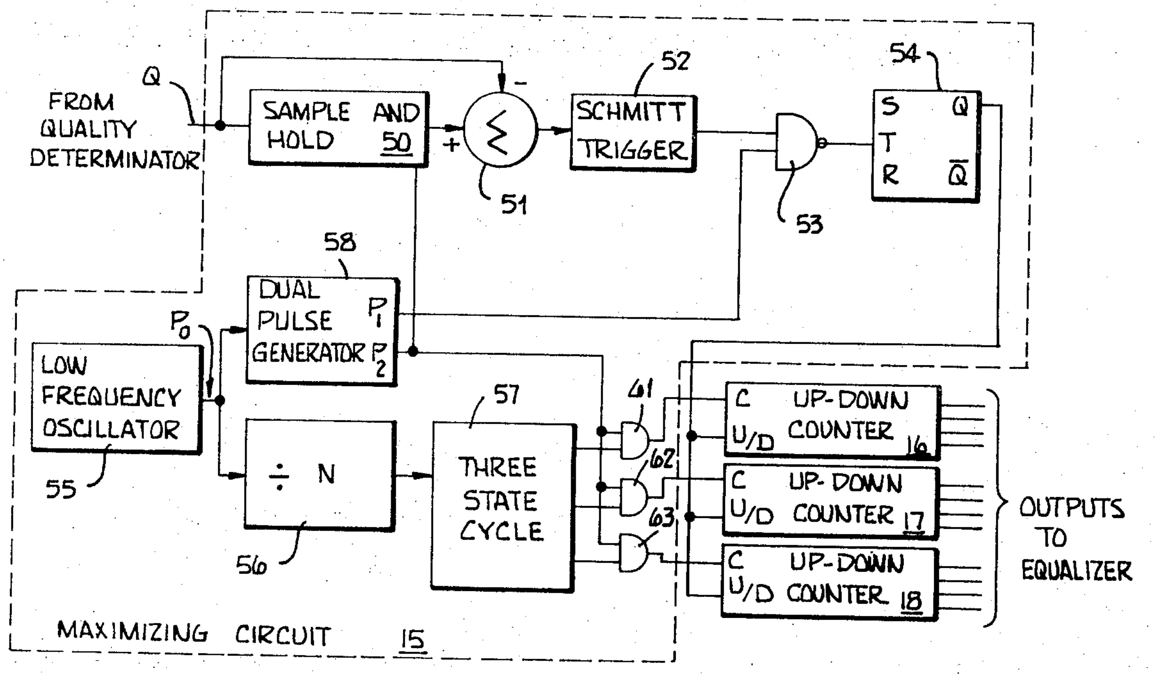
FIG. 5 is a diagram of the maximizing circuit and up-down counters of FIG. 1.

The maximizing circuit 15 and the up-down counters 16, 17 and 18 of FIG. 1 are the means for maximizing Q by adjusting the equalizer 12. These are illustrated in more detail in FIG. 5. The Q voltage from the quality determinator 14 is periodically sampled by a sample and hold circuit 50 which produces a voltage equal to the Q voltage at the time of sampling. The Q voltage is subtracted from the output of the sample and hold circuit by summation circuit 51. The output of circuit 51 represents the change in quality of the equalized signal since the time of sampling. If positive, the quality has deteriorated and, if negative, the quality has improved. A schmitt trigger 52 is used to convert the output of circuit 51 to binary form for control of one input of NAND gate 53.

To control the sequence of events in the maximizing circuit, a low frequency oscillator 55 with an output Po is used. The output of oscillator 55 is reduced in frequency by divide-by-N circuit 56. The output of circuit 56 drives a three state cycle 57 which sequentially applies a positive voltage to the inputs of AND gates 61, 62 and 63. The three state cycle device is of conventional design and may be a three stage ring counter. The term plural state cycle defines a circuit having one input and a plurality of outputs, only one output at a time being "on" and the "on" state changing sequentially among the outputs each time a signal is received at the input.

Figure 6:
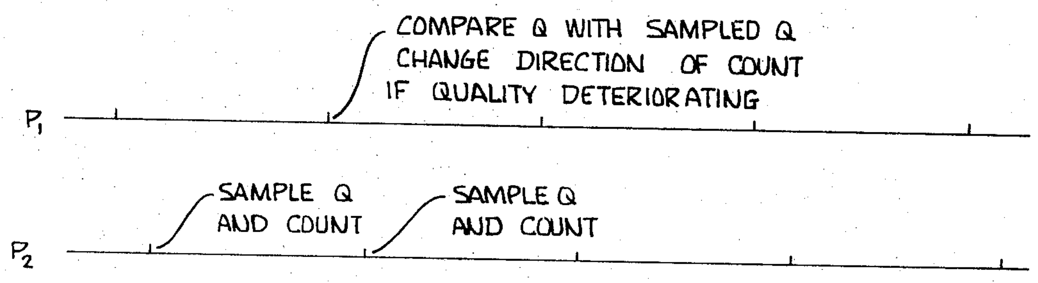
FIG. 6 shows two waveforms which illustrate the function of the maximizing circuit of FIG. 5.

Oscillator 55 also drives a dual pulse generator 58 which produces pulses $P_1$ and $P_2$, $P_2$ being slightly delayed from $P_1$. Pulses $P_1$ are applied to the input of NAND gate 53 and will cause flip-flop 54 to change state if the output of the schmitt trigger 52 is positive (indicating that the quality has been decreasing). The flip-flop 54 controls the direction of the count of the up-down counters 16, 17 and 18. Pulses $P_2$ cause the sample and hold circuit 50 to sample the Q voltage and cause one of the up-down counters to count, the one which counts being determined by the state of the three state cycle. The relationship of $P_1$ and $P_2$ is illustrated in FIG. 6.

In operation, $P_2$ causes one of the counters to count and the sample and hold circuit to sample a Q voltage. After a period of time the Q voltage will either increase or decrease depending on whether the quality has improved or deteriorated. If the quality decreased, it is likely that the counter counted the wrong way and adjusted the equalizer in the wrong direction. Only if Q has decreased will $P_1$ cause flip-flop 54 to toggle and change the direction of the counting of the up-down counters. If the quality increased, $P_1$ will not toggle the flip-flop because of NAND gate 53. For each cycle of the low frequency oscillator, one adjustment to one of the sections of the equalizer will be made. If, for example, the divide-by-N circuit 56 divides by 8, then each section will have eight adjustments at a time. After eight adjustments are made to one section, the three state cycle will change state causing adjustments to be made to another section.

The equalization process described is independent of any system clocks and is thus applicable to asynchronous systems. By modifying the quality determinator one can, by using the teachings contained herein, apply this equalization process to multi-level signals. While there have been described above the principles of this invention in connection with a specific system, it is to be clearly understood that this description is made only by way of example and not as a limitation to the scope of the invention.

What is claimed is:

1. A digital adaptive equalizer system which comprises:

a. a source of digital information, b. an electronically controllable equalizer having an input to which said source is coupled and having a digital information output, c. a quality determining means coupled to said output of said equalizer for producing a quality signal which represents the amount of time the digital information in said equalizer output is in transition from one state to another, and d. a maximizing circuit means having an input coupled to the output of said quality determining means, and having output means coupled to said equalizer for controlling said equalizer to improve the quality of digital information output therefrom.

2. The equalizer system of claim 1 in which said digital information is in binary form.

3. The equalizer system of claim 1 in which said source of digital information produces digital information in the form of a digitally modulated carrier, said quality determining means includes a demodulator having an input connected to said output of said equalizer for demodulating the carrier to obtain a digital signal, and said quality determining means also includes a quality determinator having an input connected to the output of said demodulator and an output connected to said maximizing circuit means.

4. A digital adaptive equalizer system which comprises:

a. a source of digital information, b. an electronically controllable equalizer having a plurality of stages and a first input to which said source is coupled, and having an output for an equalized signal, c. a quality determining means coupled to said equalizer output for determining the quality of the equalized signal, and having an output, d. a maximizing circuit means connected to the output of said quality determining means and having an output coupled to a second input of said equalizer for periodically adjusting each stage of said electronically controllable equalizer and including sequencing means for causing the adjustments to be made to only one of said stages at a time and for causing each of said stages to be adjusted in turn.

5. The equalizer system of claim 4 in which said maximizing circuit means includes:

a. a low frequency oscillator;

b. a pulse dividing circuit connected to the output of said oscillator, c. a plural state cycle having one input and a plurality of outputs, only one output at a time being "on" and the "on" state changing sequentially among the outputs each time a signal is received at the input, said means having an input connected to the output of said pulse dividing circuit, and having a plurality of outputs, and d. a plurality of logic gates, each of which has one output and two inputs, and has one of said logic gate inputs connected to one of said outputs of said plural state cycle means and the other logic gate input coupled to said low frequency oscillator.

6. The equalizer system of claim 5 in which said maximizing circuit means also includes a plurality of up-down counters, there being one counter for each of said stages, the inputs of said counters connecting to the outputs of said gates and the outputs of said counters connecting to said equalizer.

7. The equalizer system of claim 4 in which said maximizing circuit includes:

a. a sample and hold circuit having an input coupled to said quality determining means output to periodically sample the signal from said quality determining means, and having an output to produce thereon a signal which is identical to the signal which was last sampled, b. a comparator circuit having inputs coupled to the output of said sample and hold circuit and to the output of said quality determining means to compare signals on said outputs and produce a signal which corresponds to the difference between said input signals whereby the signal produced represents the increase or decrease in quality of the equalized digital information.

8. The equalizer system of claim 4 in which said source of digital information produces digital information in the form of a digitally modulated carrier, said quality determining means includes a demodulator having an input connected to said output of said equalizer for demodulating the carrier to obtain a digital signal, and said quality determining means also includes a quality determinator having an input connected to the output of said demodulator and an output connected to said maximizing circuit means.

9. A digital adaptive frequency domain equalizer system which comprises:

a. a source of digital information, b. an electronically controllable frequency domain equalizer having an input coupled to said source and having a digital information output and having a plurality of sections and which includes in each said section:

1. An input and a bridge circuit across which the input is connected, one side of the bridge including two series resistors and the other side of the bridge including a series LC circuit in series with a plurality of parallel switched resistors, 2. means for converting the output taken across the connection point of the two series resistors and the connection point of said LC circuit and said switched resistors to an unbalanced line output, and 3. said switched resistors each being of different values, the larger value resistors being of a value which is equal to an integer power of two times the value of the smallest resistor and said switched resistors each having electronically controlled switches to place them in out out of the bridge circuit;

c. a quality determining means having an input coupled to the digital information output of said equalizer for producing a voltage which represents the quality of digital information at the said output of said equalizer, d. a maximizing circuit means connected to the output of said quality determining means and to said equalizer for adjusting said equalizer to obtain a value for said quality voltage representative of maximum quality of digital information at the output of said equalizer, said maximizing circuit means including up-down counters having binary outputs coupled to and controlling said electronically controlled switches.

10. The equalizer system of claim 9 in which said source of digital information produces digital information in the form of a digitally modulated carrier, said quality determining means includes a demodulator having an input connected to said output of said equalizer for demodulating the carrier to obtain a digital signal, and said quality determining means also includes a quality determinator having an input connected to the output of said demodulator and an output connected to said maximizing circuit means.

11. The equalizer system to claim 10 in which said maximizing circuit includes:

a. a sample and hold circuit having an input coupled to said quality determining means output to periodically sample the signal from said quality determining means, and having an output to produce thereon a signal which is identical to the signal which was last sampled, b. a comparator circuit having inputs coupled to the output of said sample and hold circuit and to the output of said quality determining means to compare signals on said outputs and produce a signal which corresponds to the difference between said input signals whereby a signal is produced which represents the increase or decrease in quality of the equalized digital information.

* * * * *